United States Patent [19]
Guinnane

[11] Patent Number: 5,950,614
[45] Date of Patent: Sep. 14, 1999

[54] PORTABLE COOKING UTENSIL

[76] Inventor: Jennifer Guinnane, 52 St. Marks Pl., Roslyn Heights, N.Y. 11577

[21] Appl. No.: 09/130,096

[22] Filed: Aug. 6, 1998

[51] Int. Cl.$^6$ ....................................................... F24C 1/16
[52] U.S. Cl. .............................. 126/25 R; 126/29; 126/30
[58] Field of Search ..................................... 126/25 R, 29, 126/30, 41 B, 24, 26, 284

[56] References Cited

U.S. PATENT DOCUMENTS

| | | |
|---|---|---|
| 194,101 | 8/1877 | Muller . |
| 2,094,915 | 10/1937 | Dawson . |
| 3,742,839 | 7/1973 | Maley . |
| 4,145,010 | 3/1979 | Manaska . |
| 4,463,746 | 8/1984 | Knuth et al. . |
| 4,541,406 | 9/1985 | Dasambiagio . |
| 4,612,851 | 9/1986 | McManus . |
| 4,667,651 | 5/1987 | Groeneweg . |
| 4,688,549 | 8/1987 | Blankemeyer et al. ............... 126/25 R |
| 4,762,114 | 8/1988 | Blankemeyer ........................ 126/25 R |
| 4,782,813 | 11/1988 | Kopke . |

*Primary Examiner*—Carl D. Price

[57] ABSTRACT

A new portable cooking utensil for creating toasted marshmallows while outdoors. The inventive device includes a grill portion comprised of a plurality of concentric rings. The plurality of concentric rings include an innermost ring and an outermost ring. A central container is secured within the innermost ring of the grill portion. A removable container is received within the central container.

15 Claims, 3 Drawing Sheets

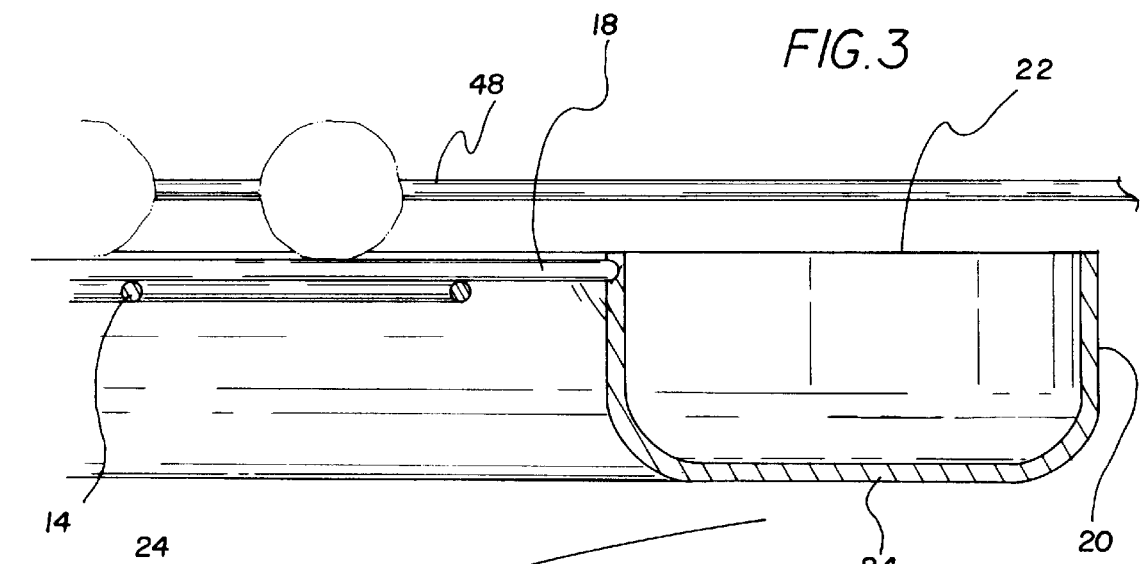
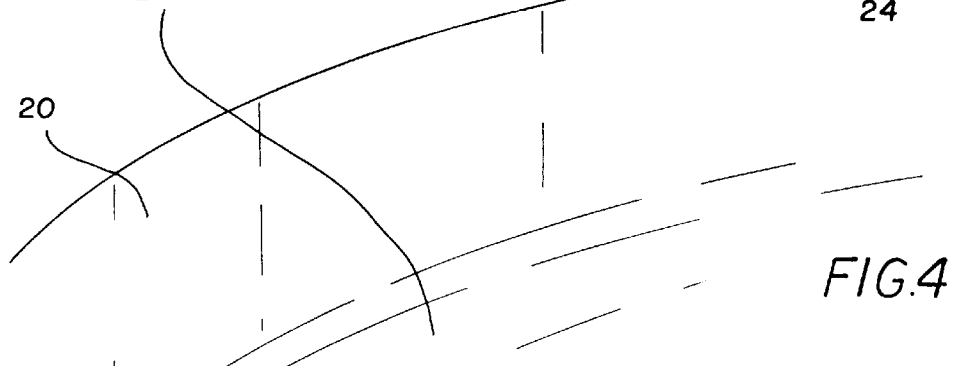
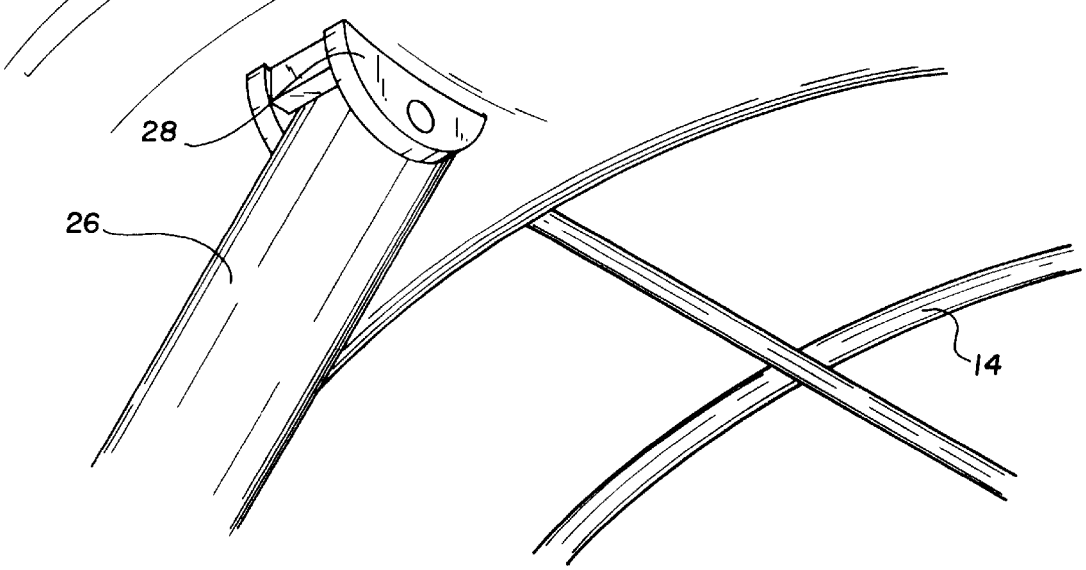

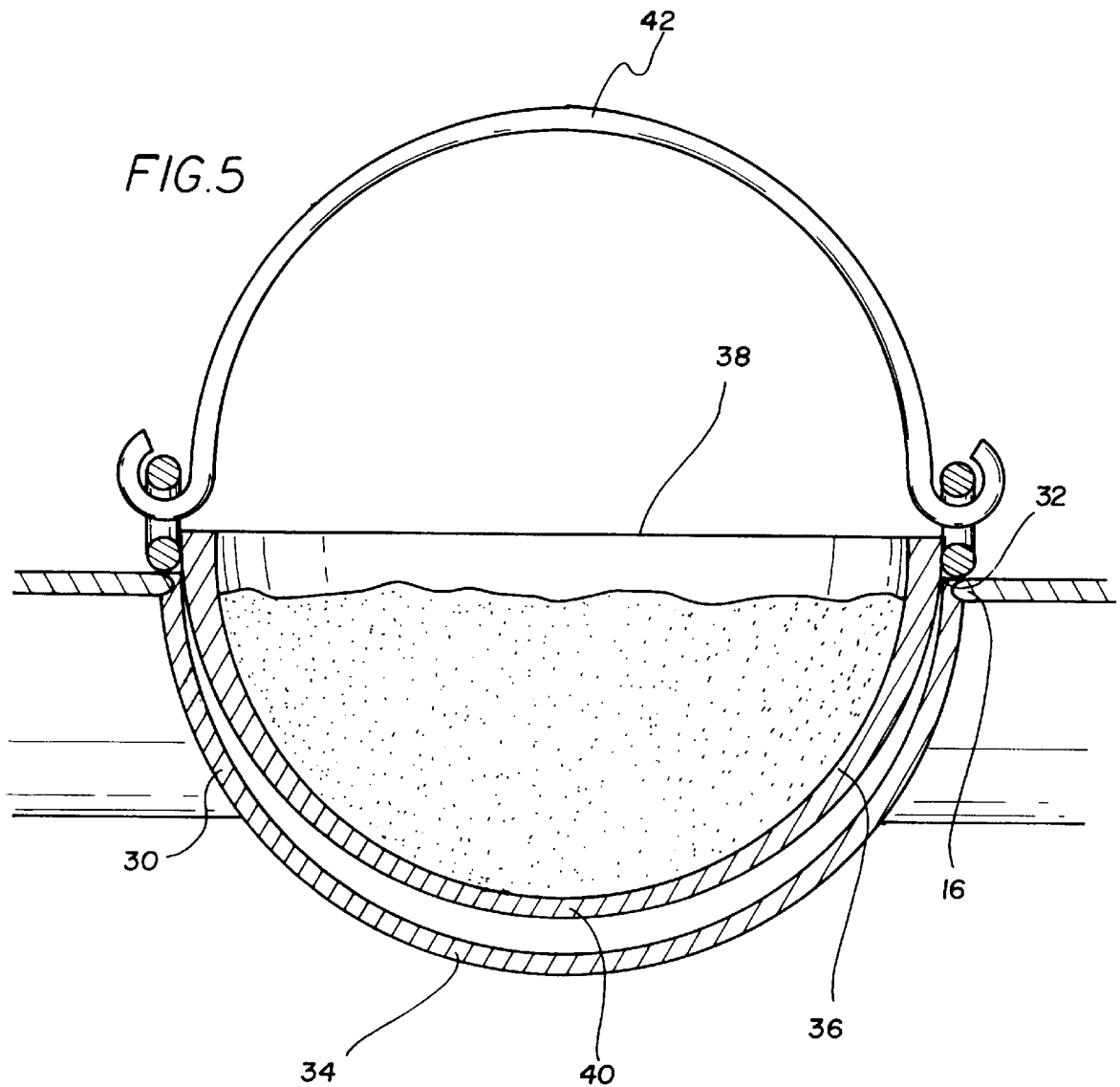

PORTABLE COOKING UTENSIL

BACKGROUND OF THE INVENTION

1. Field of the Invention

The present invention relates to cooking utensils and more particularly pertains to a new portable cooking utensil for creating toasted marshmallows while outdoors.

2. Description of the Prior Art

The use of cooking utensils is known in the prior art. More specifically, cooking utensils heretofore devised and utilized are known to consist basically of familiar, expected and obvious structural configurations, notwithstanding the myriad of designs encompassed by the crowded prior art which have been developed for the fulfillment of countless objectives and requirements.

Known prior art cooking utensils include U.S. Pat. No. 4,612,851 to McManus; U.S. Pat. No. 4,782,813 to Kopke; U.S. Pat. No. 4,541,406 to DaSambiagio; U.S. Pat. No. 4,146,010 to Manska; U.S. Pat. No. 4,667,651 to Groeneweg; and U.S. Pat. No. 4,463,746 to Knuth et al.

While these devices fulfill their respective, particular objectives and requirements, the aforementioned patents do not disclose a new portable cooking utensil. The inventive device includes a grill portion comprised of a plurality of concentric rings. The plurality of concentric rings include an innermost ring and an outermost ring. A central container is secured within the innermost ring of the grill portion. A removable container is received within the central container.

In these respects, the portable cooking utensil according to the present invention substantially departs from the conventional concepts and designs of the prior art, and in so doing provides an apparatus primarily developed for the purpose of creating toasted marshmallows while outdoors.

SUMMARY OF THE INVENTION

In view of the foregoing disadvantages inherent in the known types of cooking utensils now present in the prior art, the present invention provides a new portable cooking utensil construction wherein the same can be utilized for creating toasted marshmallows while outdoors.

The general purpose of the present invention, which will be described subsequently in greater detail, is to provide a new portable cooking utensil apparatus and method which has many of the advantages of the cooking utensils mentioned heretofore and many novel features that result in a new portable cooking utensil which is not anticipated, rendered obvious, suggested, or even implied by any of the prior art cooking utensils, either alone or in any combination thereof.

To attain this, the present invention generally comprises a grill portion comprised of a plurality of concentric rings. The plurality of concentric rings include an innermost ring and an outermost ring. A circular tray is secured to the outermost ring of the grill portion. The circular tray has an open upper end and a closed lower end. The circular tray extends around an outer periphery of the grill portion. A plurality of legs extend downwardly from the closed lower end of the circular tray. The plurality of legs include brackets secured to the lower end of the circular tray with respective legs pivotally coupled with the brackets. A central container is secured within the innermost ring of the grill portion. The central container has an open upper end and a closed rounded lower end. The closed rounded lower end extends downwardly with respect to the grill portion. A removable container is received within the open upper end of the central container. The removable container has an open upper end and a closed lower end. The removable container has an inverted U-shaped handle pivotally secured thereto. A plurality of hooks are secured to and extend outwardly from the circular tray. A plurality of skewers are provided with each having an elongated main member. Each main member has a handle disposed on an outer end thereof. Each main member has a plurality of cross members extending through an inner end portion thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable cooking utensil apparatus and method which has many of the advantages of the cooking utensils mentioned heretofore and many novel features that result in a new portable cooking utensil which is not anticipated, rendered obvious, suggested, or even implied by any of the prior art cooking utensils, either alone or in any combination thereof.

It is another object of the present invention to provide a new portable cooking utensil which may be easily and efficiently manufactured and marketed.

It is a further object of the present invention to provide a new portable cooking utensil which is of a durable and reliable construction.

An even further object of the present invention is to provide a new portable cooking utensil which is susceptible of a low cost of manufacture with regard to both materials and labor, and which accordingly is then susceptible of low prices of sale to the consuming public, thereby making such portable cooking utensil economically available to the buying public.

Still yet another object of the present invention is to provide a new portable cooking utensil which provides in the apparatuses and methods of the prior art some of the advantages thereof, while simultaneously overcoming some of the disadvantages normally associated therewith.

Still another object of the present invention is to provide a new portable cooking utensil for creating toasted marshmallows while outdoors.

Still yet another object of this invention will be to stop children from leaning over camp fires and requiring them to cook from a safe distance.

Yet another object of the present invention is to provide a new portable cooking utensil which includes a grill portion comprised of a plurality of concentric rings. The plurality of concentric rings include an innermost ring and an outermost ring. A central container is secured within the innermost ring of the grill portion. A removable container is received within the central container.

Still yet another object of the present invention is to provide a new portable cooking utensil that allows a person to create a delicious snack while enjoying outdoor activities.

Even still another object of the present invention is to provide a new portable cooking utensil that allows a wider variety of food to be served during outdoor activities.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the present invention as taken along line 3—3 of FIG. 2.

FIG. 4 is a partial bottom perspective view of the present invention illustrating the pivoting leg thereof.

FIG. 5 is a cross-sectional view of the removable pot of the present invention.

DESCRIPTION OF THE PREFERRED EMBODIMENT

Figure 1:
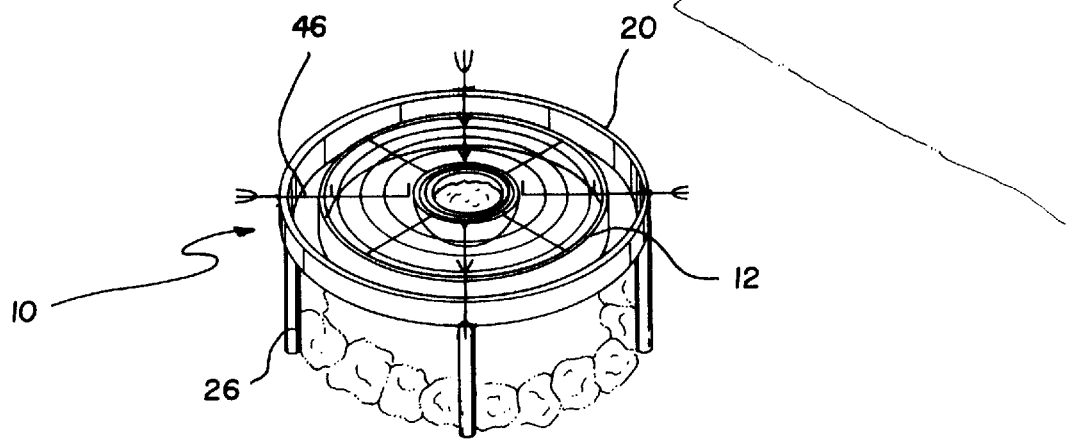
FIG. 1 is a plan perspective view of a new portable cooking utensil according to the present invention.
Figure 2:
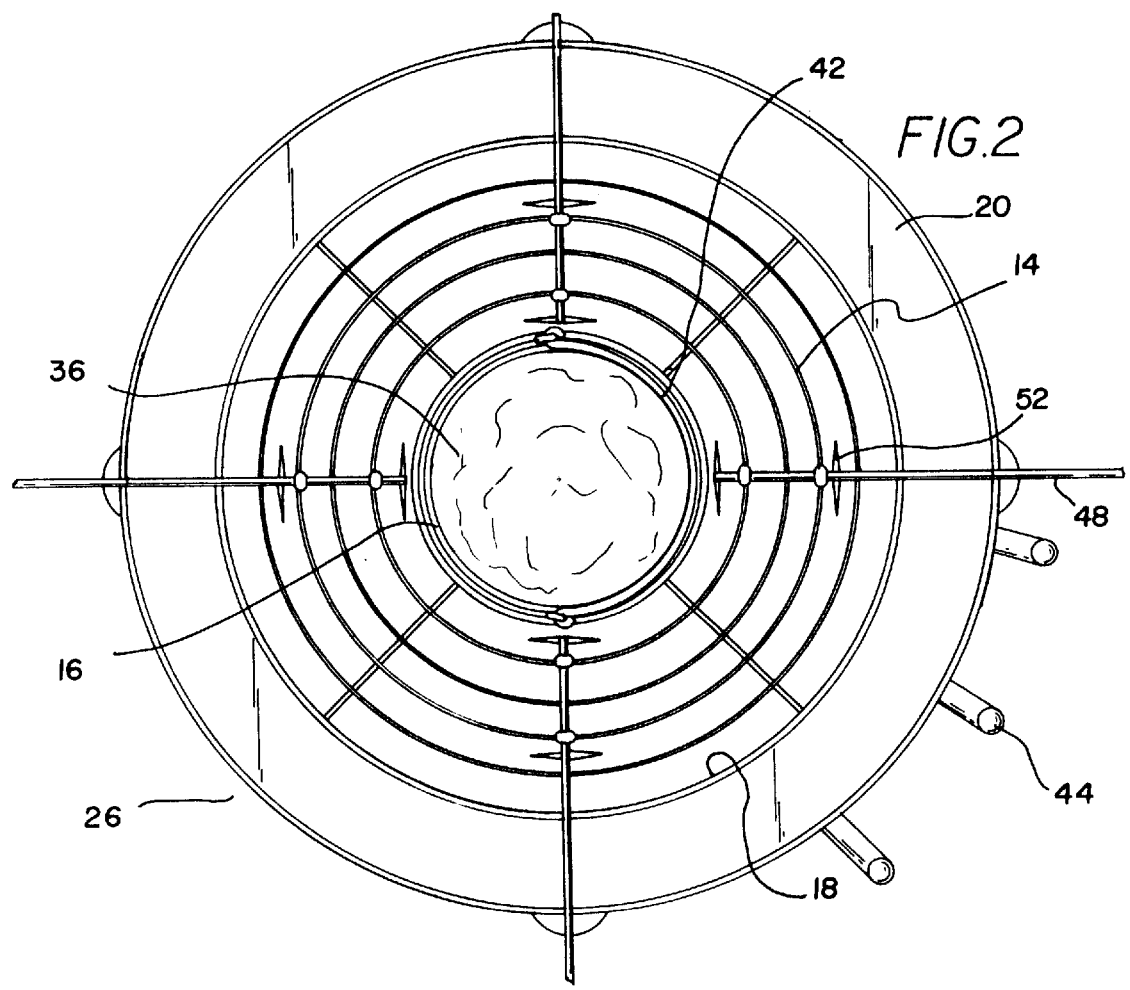
FIG. 2 is a top plan view of the present invention.

With reference now to the drawings, and in particular to FIGS. 1 through 5 thereof, a new portable cooking utensil embodying the principles and concepts of the present invention and generally designated by the reference numeral 10 will be described.

As best illustrated in FIGS. 1 through 5, the portable cooking utensil 10 comprises a grill portion 12 comprised of a plurality of concentric rings 14. The plurality of concentric rings 14 include an innermost ring 16 and an outermost ring 18.

A circular tray 20 is secured to the outermost ring 18 of the grill portion 12. The circular tray 20 has an open upper end 22 and a closed lower end 24. The circular tray 20 extends around an outer periphery of the grill portion 12. The circular tray 20 is not positioned over the fire while in use nor is the circular tray 20 at the same level as the grill portion 12. The circular tray 20 is constructed of a heat resistant material to prevent burning of a person's skin when contacting.

A plurality of legs 26 extend downwardly from the closed lower end 24 of the circular tray 20. The plurality of legs 26 include brackets 28 secured to the lower end 24 of the circular tray 20 with respective legs 26 pivotally coupled with the brackets 28.

A central container 30 is secured within the innermost ring 16 of the grill portion 12. The central container 30 has an open upper end 32 and a closed rounded lower end 34. The closed rounded lower end 34 extends downwardly with respect to the grill portion 12.

A removable container 36 is received within the open upper end 32 of the central container 30. The removable container 36 has an open upper end 38 and a closed lower end 40. The removable container 36 has an inverted U-shaped handle 42 pivotally secured thereto.

A plurality of hooks 44 are secured to and extend outwardly from the circular tray 20. The hooks 44 allow for the attachment of desired cooking utensils.

A plurality of skewers 46 are provided with each having an elongated main member 48. Each main member 48 has a handle 50 disposed on an outer end thereof. Each main member 48 has a plurality of cross members 52 extending through an inner end portion thereof.

In use, the grill portion 12 is positioned over an open fire with the plurality of legs 26 extended to support the grill portion 12 over the open fire. The user could then place marshmallows on the cross members 52 of the skewers 46 and place them directly on the grill portion 12 with the marshmallows directly above the fire. Chocolate sauce could be poured into the removable container 36 which would be placed within the central container 30 for heating. As the marshmallows would become brown and crispy, they would be removed from the fire, dipped in the chocolate sauce, and placed between two graham crackers. The graham crackers could be stored in the circular tray 20 which is positioned outside of the fire. Alternately, the device 10 could be used to grill hot dogs, hamburgers and the like.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable cooking utensil for creating toasted marshmallows while outdoors comprising, in combination:

a grill portion comprised of a plurality of concentric rings, the plurality of concentric rings including an innermost ring and an outermost ring;

a central container secured within the innermost ring of the grill portion;

a removable container received within the central container; and a circular tray extending around an outer periphery of the grill portion, the circular tray having an open upper end and a closed lower end.

2. The portable cooking utensil as set forth in claim 1 wherein the removable container has an inverted U-shaped handle pivotally secured thereto.

3. The portable cooking utensil as set forth in claim 1 and further including a plurality of skewers each having an elongated main member.

4. The portable cooking utensil as set forth in claim 3 wherein each main member has a handle disposed on an outer end thereof, each main member having a plurality of cross members extending through an inner end portion thereof.

5. The portable cooking utensil as set forth in claim 1 and further including a plurality of legs extending downwardly from the closed lower end of the circular tray.

6. The portable cooking utensil as set forth in claim 1 wherein each of the plurality of legs includes brackets secured to the lower end of the circular tray with respective legs pivotally coupled with the brackets.

7. The portable cooking utensil as set forth in claim 1 and further including a plurality of hooks secured to and extending outwardly from the circular tray.

8. A portable cooking utensil for creating toasted marshmallows while outdoors comprising, in combination:

a grill portion comprised of a plurality of concentric rings, the plurality of concentric rings including an innermost ring and an outermost ring;

a circular tray secured to the outermost ring of the grill portion, the circular tray having an open upper end and a closed lower end, the circular tray extending around an outer periphery of the grill portion;

a plurality of legs extending downwardly from the closed lower end of the circular tray, the plurality of legs including brackets secured to the lower end of the circular tray with respective legs pivotally coupled with the brackets;

a central container secured within the innermost ring of the grill portion, the central container having an open upper end and a closed rounded lower end, the closed rounded lower end extending downwardly with respect to the grill portion;

a removable container received within the open upper end of the central container, the removable container having an open upper end and a closed lower end, the removable container having an inverted U-shaped handle pivotally secured thereto;

a plurality of hooks secured to and extending outwardly from the circular tray; and a plurality of skewers each having an elongated main member, each main member having a handle disposed on an outer end thereof, each main member having a plurality of cross members extending through an inner end portion thereof.

9. A portable cooking utensil, comprising:

a grill portion comprised of a plurality of concentric rings, the plurality of concentric rings including an innermost ring and an outermost ring;

a central container secured within the innermost ring of the grill portion;

a removable container received within the central container; and a circular tray secured to the outermost ring of the grill portion, the circular tray having an open upper end and a closed lower end, the circular tray extending around an outer periphery of the grill portion.

10. The portable cooking utensil as set forth in claim 9 and further including a plurality of legs extending downwardly from the closed lower end of the circular tray.

11. The portable cooking utensil as set forth in claim 10 wherein each of the plurality of legs includes brackets secured to the lower end of the circular tray with respective legs pivotally coupled with the brackets.

12. The portable cooking utensil as set forth in claim 9 and further including a plurality of hooks secured to and extending outwardly from the circular tray.

13. The portable cooking utensil as set forth in claim 9 wherein the removable container has an inverted U-shaped handle pivotally secured thereto.

14. The portable cooking utensil as set forth in claim 9 and further including a plurality of skewers each having an elongated main member.

15. The portable cooking utensil as set forth in claim 14 wherein each main member has a handle disposed on an outer end thereof, each main member having a plurality of cross members extending through an inner end portion thereof.

\* \* \* \* \*